June 24, 1958  S. G. BEST  2,840,170
SERVO CONTROL SYSTEM FOR A VARIABLE PITCH PROPELLER
Filed April 28, 1954
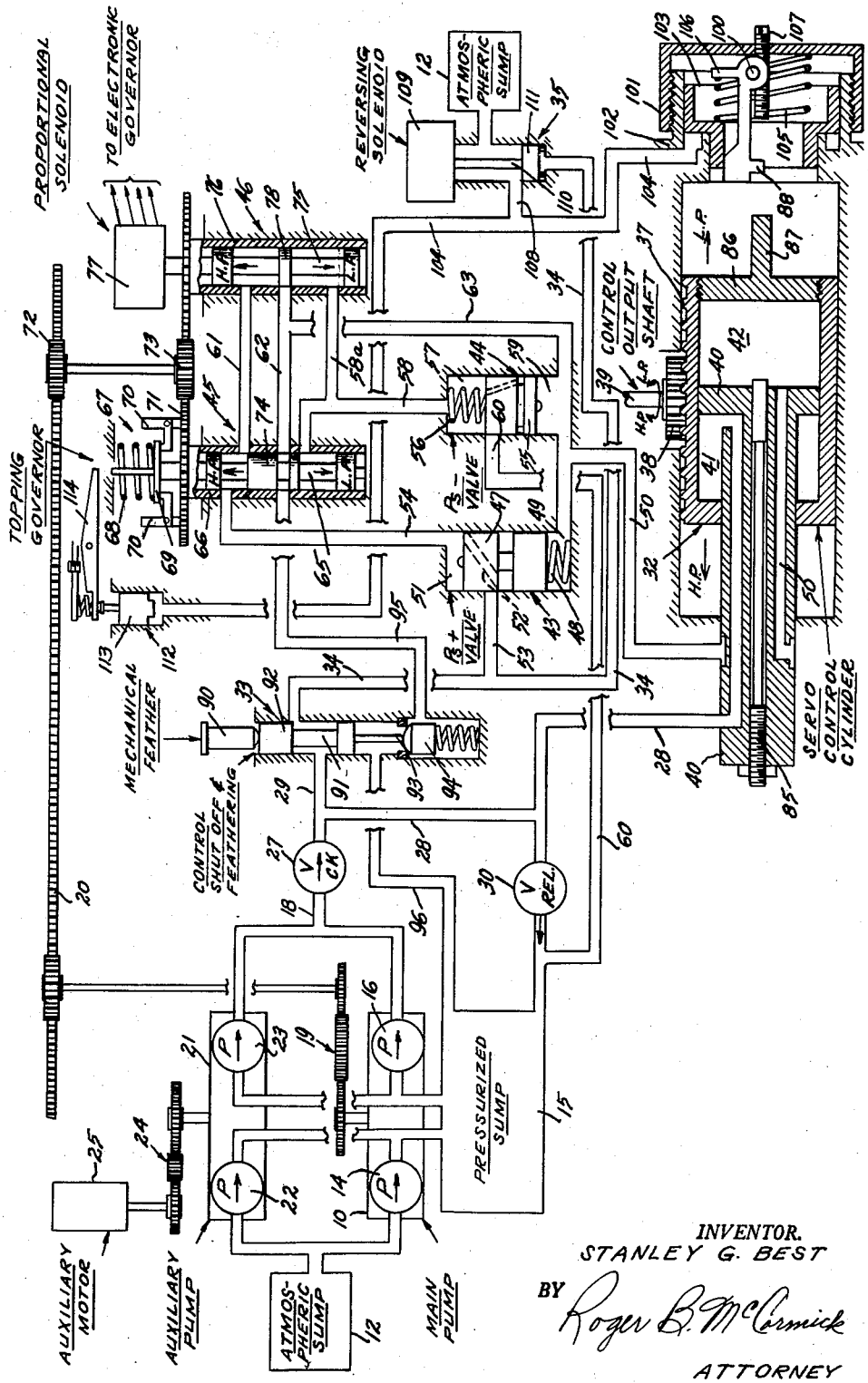
INVENTOR.
STANLEY G. BEST
BY Roger B. McCormick
ATTORNEY United States Patent Office 2,840,170
Patented June 24, 1958

2,840,170
SERVO CONTROL SYSTEM FOR A VARIABLE PITCH PROPELLER

Stanley G. Best, Manchester, Conn., assignor to United Aircraft Corporation, East Hartford, Conn., a corporation of Delaware Application April 28, 1954, Serial No. 426,061

13 Claims. (Cl. 170—160.2)

This invention relates to improvements in aircraft propellers and, more specifically, to an improved servo control system for operating the pitch change mechanism of a propeller.

The servo system utilizes hydraulic forces to operate a reversible servo motor which, in selective and controlled movements, operates the propeller blade pitch changing mechanism. The system may be described generally as comprising a plurality of interconnected valves including a flow control valve for the servo motor and also including a pair of fluid pressure regulating valves which cooperate with the flow control valve to provide for fluid flow to or from the servo motor to cause selective operation thereof. As will be described in detail, the system and the servo motor normally operate automatically to control propeller speed by changing the propeller blade pitch angle. However, the system and servo motor are also utilized in effecting pilot selected pitch changes as, for example, in feathering the propeller and reversing the pitch of the same. While the servo system is described herein in connection with its use in an aeronautical propeller installation, it will become apparent that the said system can be used to advantage in many other installations as the control means for operating a wide variety of mechanisms.

Accordingly, the system is described in detail without specific reference to any particular propeller assembly or to any particular pitch changing mechanism. United States Patent No. 2,652,122 to Longfellow may be relied upon for a disclosure of propeller assembly and pitch change mechanism which can be operated by the servo control system.

It is the general object of the invention to provide a safe, foolproof, hydraulically operated servo system for effecting pitch control in an aeronautical propeller.

A fore specific object of the invention is to provide a servo system which includes an hydraulically operated servo motor, a flow control valve connected to the servo motor and a pair of pressure regulating valves connected to the control valve and responsive to fluid pressure in the servo motor to maintain constant pressure differentials in the flow control valve for the purpose of assuring that flow rates to or from the servo motor may be fixed by the control valve at predetermined levels despite variations of fluid pressure within the servo motor and independently of operating force requirements.

Other objects and advantages of the invention will become apparent to those skilled in the art from the following description of the annexed drawing, in which, The figure of the drawing is a schematic illustration of the servo system.

As previously mentioned, the system is adapted to utilize hydraulic fluid for operating a reversible servo motor which drives the propeller pitch changing mechanism. In order that the system may be supplied with hydraulic fluid under pressure, a main pump unit 10 is arranged to withdraw oil or other hydraulic fluid from an atmospheric sump 12 by means of one pump 14 which discharges the oil into a pressurized sump 15. Another pump 16, included in the main pump unit 10, withdraws the oil from the pressurized sump and discharges the same into the system through a line 18. It is preferred that the aforementioned main pump unit 10 comprise a pair of gear pumps 14 and 16 arranged in tandem fashion and connected to a gear train 19 driven by a gear 20 which rotates with the propeller. As shown in the aforementioned Longfellow patent, the drive gear 20 may comprise a large diameter gear forming a part of the hub section of the propeller so as to rotate at equal speed therewith. Accordingly, during normal propeller operation, the tandem pump unit 10 and the sumps 12 and 15 provide means for continually introducing hydraulic fluid under pressure to the control system.

A generally similar tandem pump unit 21, including the pumps 22 and 23, is adapted to supply the system during the periods that the propeller is not rotated. More specifically, the pump unit 21 is driven through a gear train 24 by an electric motor 25 which may be manually controlled for operation while the propeller is feathered or during very low speed engine operation. While not a part of this invention, it will be readily understood that automatically operable means may be utilized to energize and de-energize the auxiliary motor 25 at preselected propeller operating speeds or positions.

The hydraulic fluid which is introduced to the system through the line 18 passes first through a check valve 27 disposed in the line 18 to maintain pressure within the system. Having passed the check valve 27, the hydraulic fluid passes into two main intercommunicating branch lines or passages 28 and 29. A high pressure relief valve 30 is connected in the line 28 to fix the upper limit of pressure within the system at a preselected level, the valve 30 being connected to the pressurized sump 15 to drain thereinto in the event the selected pressure is exceeded within the system. The line 28 terminates within a servo cylinder 32 which, as will be more fully explained hereinafter, constitutes an important part of the servo motor and which transmits the motion and force to operate the propeller pitch changing mechanism (not shown).

The main branch line 29 extends into a normally open valve 33 which when closed shuts off a portion of the system and conditions the same for feathering the propeller. A passage or line 34 extending from the valve 33, and normally in communication with the main branch line 29, extends to a solenoid operated valve 35 which, as will be explained hereinafter, is utilized to condition the system for reversing the pitch of the propeller.

The various valves included in the system are shown in the positions they assume when no propeller pitch change is called for, as for example, when the propeller is rotating at the equilibrium or selected speed for a power setting selected and fixed by the pilot. Therefore, it may be said that the valves as shown reflect an "on speed" propeller operating condition. The particular pitch angle of the blades is reflected in the position of the servo cylinder 32 which is arranged for axial reciprocation to increase and decrease the pitch angle. More specifically, the servo cylinder 32 constitutes a rack having teeth indicated at 37 which engage a pinion 38 fixed to an output shaft 39 to transmit motion and force to the propeller pitch changing mechanism. Assuming that rotation of the shaft 39 in the counterclockwise direction, as indicated by the arrow, causes a change toward low pitch, it will be seen that right-hand movement of the cylinder is accompanied by movement of the propeller towards low pitch and that left-hand movement of the cylinder is accompanied by propeller movement towards high pitch.

As shown in the drawing, the cylinder 32 is arranged to reciprocate over a fixed piston 40. The hydraulic fluid under pump pressure in the line 28 is introduced to the cylinder in the chamber 41 on the left-hand side of the piston 40. The cylinder 32 is exposed over substantially less area to the chamber 41 than to the chamber 42 defined at the other end of the cylinder. For exemplary purposes, it may be assumed that the exposed left end face area of the cylinder is ½ the exposed right end face area thereof. Accordingly, it will be seen that fluid within the chamber 42 under half the pressure of the fluid within the chamber 41 (half pump pressure) will effect a pressure balance on the opposite ends of the cylinder 32 so that no movement of the said cylinder will be effected. It will be readily understood that cylinder reciprocation can be brought about by fluid flow into and out of one or both of the chambers 41 and 42. It has been found most convenient to cause reciprocation of the cylinder 32 by fluid flow into and out of the chamber 42. Fluid flow into the chamber 42 will, of course, increase the fluid presure therein while flow from the chamber 42 will decrease the pressure therein. If the increase in fluid or servo pressure (Ps) in chamber 42 is in excess of the operating load and forces imposed on the cylinder 32, the said cylinder will be moved toward the right to cause propeller change in the low pitch direction. If the decrease in servo pressure (Ps) in chamber 42 is in excess of the operating load and forces imposed on the cylinder 32, the said cylinder will be moved toward the left to cause propeller change in the high pitch direction. In fulfilling one object of the invention, means are provided to assure flow to or from the chamber 42 at fixed rates corresponding to selected positions of a flow control valve to effect desired cylinder movement despite variations in the imposed load and forces on the cylinder and without regard to the level of servo (Ps) pressure in the chamber 42.

In accordance with this aspect of the invention, means are provided for producing fluid pressure a fixed amount greater than pressure (Ps) within the chamber 42 and other means are provided to produce fluid pressure a fixed amount less than Ps pressure. The said pressure producing means comprise a pair of pressure regulating valves indicated generally by the reference numerals 43 and 44. The pressure regulating valves 43 and 44 are connected to two flow control valves 45 and 46, the valve 46 being adapted during normal operation to selectively connect the pressure regulating valves with the servo chamber 42, and the valve 45 being included as a safety flow control valve to prevent propeller overspeeding.

With specific reference to the valve 43, it will be noted that the same includes an axially movable valve member 47 which is biased in one direction by a spring 48. The chamber 49 surrounding the said spring communicates with the servo chamber 42 through the passage 50 which extends through the piston 40. Accordingly, the fluid pressure within the spring chamber 49 is equal to the fluid presure (Ps) in the servo chamber 42 and exerts pressure against the bottom of the valve member 47 which pressure is supplemented by the force of the spring 48. The fluid pressure and spring force tend to move the valve member 47 upwardly to close a chamber 51 at the top end of the valve member. However, when the valve member 47 is shifted upwardly, a passage 52, extending at an oblique angle through the valve member and opening into the chamber 51, is brought into communication with a passage 53 connected to the line 34 having hydraulic fluid at pump pressure. For the purpose of fully understanding the operation of the valve 43, it may be assumed that pump pressure is considerably greater than servo pressure (Ps) during all anticipated operating conditions. It can also be assumed that the spring 48 exerts a force on the valve member having a pressure equivalent less than the difference between pump pressure and servo pressure. Therefore, the chamber 51 will become filled with hydraulic fluid which presses the valve member 47 downwardly in opposition to the combined fluid and spring pressure in the chamber 49. When the valve member 47 is thrust downwardly to the position shown, the internal passageway 52 will no longer be connected to the source of hydraulic fluid at pump pressure and pressure in the chamber 51 will equal the servo pressure within the spring chamber 49 plus the pressure equivalent exerted by the spring 48. In other words, the chamber 51 in the valve 43 provides a source of hydraulic fluid at a pressure a fixed amount greater than the pressure (Ps) within the servo chamber 42. Assuming spring 48 to have a pressure equivalent of 30 p. s. i., the high pressure chamber will always have fluid at 30 p. s. i. greater than servo pressure. As shown in the drawing, the high pressure chamber 51 is connected by the passage 54 to the uppermost port of the control valve 45.

The pressure regulating valve 44 includes an axially movable valve body 55 which is biased downwardly by a spring 56. The chamber 57 surrounding the spring 56 is connected by a passageway 58 to the lowermost port on the valve 45 and is also connected by the branch passageway 58a to the lowermost port on the valve 46. The chamber 59 on the opposite side of the movable member 57 is in communication with the servo chamber 42 through the passage 50. Accordingly, the fluid pressure within the chamber 59 will equal the pressure (Ps) within the servo chamber 42. It will be seen that the servo pressure within the chamber 59 must equal the fluid pressure within the chamber 57 plus the force of the spring 56 which, for purpose of illustration, may be assumed to exert a force on the valve body 55 equivalent to 30 lbs. per sq. inch of fluid pressure, or the valve member 55 will be thrust downwardly tending to close the chamber 59. However, when the valve body 55 is thrust downwardly from the position shown, a drain passage 60 is opened into the spring chamber 57. The said drain passage 60 extends to the pressurized sump wherein the hydraulic fluid is contained at considerably less than servo pressure (Ps). Thus, the fluid pressure within the chamber 57 will be balanced in the position shown to close the drain passage. In such position of the valve member, the fluid pressure within the chamber 57 and passageway 58 will be 30 lbs. per sq. inch less than the pressure (Ps) within the servo chamber.

The pressure drop between the lower faces of valve members 47 and 55 and the annular grooves therein is substantially constant. In this connection, a passageway is provided through the valve member 55 from the top thereof to its groove whereby the annular groove in the said valve will receive fluid at the pressure in the valve chamber 57. Thus, the pressure differential from the chamber 59 to the groove in the valve 55 is always thirty pounds whereby to avoid a change in any leakage which may occur around the valve member 55 resulting from a pressure change. Likewise, the passage 52 in the valve member 47 is disposed so as to cause a pressure differential between the chamber 49 and the groove in the valve 47 which is also constant at thirty pounds.

As previously mentioned, the aforedescribed pressure regulating valves 43 and 44 are cooperatively associated with the control valves 45 and 46 which function to selectively connect fluid passages from the said pressure regulating valves to the servo cylinder chamber 42. Each of the said control valves includes an axially movable valve member which is subjected to movement in response to propeller speed changes. The valve 45, which may properly be referred to as a "topping governor valve," comprises a safety valve adapted to prevent serious overspeeding of the propeller. For normal operation of the propeller, i. e., over a preselected range of operating speeds, the movable valve member remains in substantially the position. When propeller speeds exceed the upper limit of the preselected range, the said valve member will be moved in a manner to be more fully described hereinafter.

The valve 46 may properly be referred to as a "proportional solenoid operated flow control valve" and functions to selectively control flow between the pressure regulating valves and the servo chamber throughout the said preselected range of operating speeds, thereby exercising precise speed control of the propeller in keeping with a selected power setting. As will be more fully described, electronic means are provided to transmit a signal to the coils of the solenoid, in response to propeller speed variations from the selected level, to shift the position of the movable member included in the valve structure. The said movable member is shown in the position assumed when no signal is being transmitted to the coils, as when the propeller is rotating at the selected speed.

Before describing the flow control valves 45 and 46 in detail, it is important to note that the high pressure passage 54 from the valve 43 communicates with the uppermost port on the valve 45 and that high pressure fluid flows through a normally open port in the valve 45 into a passage 61 which communicates with the uppermost port in the solenoid operated distributor valve 46. It should also be noted that the intermediate ports of the valves 45 and 46 are interconnected by the line 62 which communicates with the servo chamber 42 by means of the passage 63. Accordingly, in top-to-bottom order the valves 45 and 46 are in communication with hydraulic fluid at pressures a fixed amount greater than the pressure ($P_s$) in the servo cylinder chamber 42, at the pressure ($P_s$) in the servo chamber and at a pressure a fixed amount less than servo chamber pressure ($P_s$).

With more specific reference to the topping governor valve 45, it will be seen that the axially movable valve member is designated by the reference numeral 65. The said valve member moves within a sleeve 66 with the upper portion of the valve member extending above the sleeve and forming a part of a centrifugally operated governor mechanism indicated generally by the reference numeral 67. Included in the governor mechanism is a speeder spring 68 which is seated upon a plate 69 secured to the projecting portion of the valve member. The spring tends to force the valve member downwardly within the sleeve to the position shown. The spring force is opposed by a pair of flyweights 70, 70 which are pivotally mounted on a gear 71 to engage the bottom face of the plate 69. The gear 71 is driven by the propeller through gears 72 and 73, it being shown that gear 72 is engaged by the propeller ring gear 20. It will be readily understood that as the propeller rotates and gear 71 is driven, the flyweights 70, 70 tend to pivot outwardly and thereby exert a force on the valve member 65 in opposition to the speeder spring 68. Accordingly, the speeder spring may be selected to permit upward movement of the valve member at a preselected propeller speed. In accordance with the invention, upward movement of the valve member 65 is utilized to stop flow of high pressure oil toward the servo cylinder 32 so that there can be no low pitch movement of the said cylinder.

More specifically, the valve member 65 is provided with a land 74 adapted to control the ports in communication with passages 61 and 62. During normal propeller operation, i. e., while the propeller is operating below the selected maximum speed, the valve land 74 is disposed as shown in the drawing to connect the passage 62 with a passage 95 extending to the feathering valve 33 where it is normally closed as will be more fully described. It will be observed that in this position of the land 74, the passage 62 cannot communicate with the passage 58 to the low pressure regulating valve. Also in this position of the valve member, high pressure flow is accommodated from the high pressure regulating valve 43 to the solenoid operated control valve 46 through passages 54 and 61. When centrifugal forces brought about by an overspeeding propeller overcome the force of the speeder spring and valve member 65 is shifted upwardly, the land 74 will close passage 61 and open passage 62 for flow into passageway 58 extending to the low pressure regulating valve 44. This flow of fluid at substantially the pressure present in the servo chamber 42 and valve chamber 59 will force valve body 55 downwardly in valve 44 so that drain passageway 60 is opened therein. Thereby, fluid from the servo chamber is drained to the pressurized sump and the servo pressure ($P_s$) is reduced to permit left-hand or high pitch movement of the servo cylinder.

From the foregoing description, it should be fully understood that the topping governor valve 45 provides means for limiting the speed of a propeller at a fixed level which is determined by selection of the speeder spring. During propeller operation at speeds below the selected limit, the valve 45 has no effect and permits flow of high pressure fluid to the solenoid operated flow control or distributor valve 46 whereupon said fluid may be utilized to decrease pitch and increase propeller speed in the exercise of exacting control of propeller speed.

With specific reference to the valve 46, it will be seen that the valve member 75 is arranged for movement within a sleeve 76 and projects thereabove. The projecting portion of the said member comprises the armature of a proportional solenoid 77 which may include one or more coils adapted upon being energized by signals to move the armature and valve member upwardly or downwardly, the magnitude of movement depending upon the potential of the signal. The means for transmitting the signal may comprise an electronic governor (not shown). The said electronic governor is arranged to sense a propeller speed variation from the speed in keeping with a selected power setting. More specifically, when the pilot makes a setting of his power controls, the propeller should rotate at a certain or specified speed for such power setting for optimum efficiency. Changes in air density and changes in aircraft flight attitudes will influence propeller speed. The electronic governor is actuated by a change in the propeller speed to generate and transmit the proper signal to the solenoid 77 to adjust the position of valve member 75 which, as will be shown, causes servo operation to increase or decrease propeller pitch and thereby correct the propeller speed.

A land 78 is provided on the movable valve member 75 to close and selectively open the passage 62, which is connected to the servo chamber 42, for high pressure flow and for draining purposes. More specifically, the land 78 normally closes the passage 62, as when no correcting signal is transmitted by the electronic governor. When the valve member 75 is thrust downwardly by the solenoid, as will occur upon a signal transmitted as a result of underspeeding, the passage 62 is opened for the flow of fluid from the high pressure passage 61. The increase of pressure in passage 62 causes increased pressure ($P_s$) in the servo chamber 42, resulting in a servo cylinder shift toward low pitch to increase propeller speed. When the valve member is elevated by the solenoid in response to propeller overspeeding, passage 62 will be opened to drain fluid from the servo chamber into the passage 58a to the low pressure regulating valve 44.

It is important to observe that flow of fluid into chamber 42 increases the pressure ($P_s$) therein. The new or increased pressure in chamber 42 is reflected in the pressure in the spring chamber 49 of the high pressure regulating valve 43. As previously described, an increased in pressure in the said spring chamber opens the valve 43 to the flow of fluid at pump pressure until the pressure in high pressure passages 54 and 61 is 30 p. s. i. in excess of the pressure in the spring chamber 49. Accordingly, as the servo pressure ($P_s$) in chamber 42 increases, the pressure in high pressure passage 61 increases a corresponding amount and the pressure drop in control valve 46 from passage 61 to passage 62 will always be 30 p. s. i. As a result, the flow rate to the chamber 42 will not vary with pressure changes in the chamber 42 and the rate will be fixed by the opening afforded in the valve 46, said opening being determined by the amount of movement of the valve member 75 as is controlled by the proportional solenoid.

Flow from chamber 42 through valve 46 will decrease the pressure (Ps) in the chamber 42 which decreased pressure (Ps) is also present in chamber 59 of the low pressure regulating valve 44. As previously described, a decrease in pressure in chamber 59 opens the valve 44 to drain until the pressure in low pressure passages 58 and 58a is 30 p. s. i. below the pressure (Ps) in servo chamber 42. Accordingly, as the servo pressure (Ps) in chamber 42 decreases, the pressure in passage 58a decreases a corresponding amount and the pressure drop in control valve 46 from passage 62 to passage 58a will always be 30 p. s. i. As a result, the flow rate from servo chamber 42 will not vary with pressure changes in chamber 42 and the rate will be fixed by the valve 46 as controlled by the proportional solenoid.

It will be understood then, that flow rates to or from the servo chamber 42 being fully controlled by the control valve 46, the selected rate of flow will continue until the desired propeller pitch change has been effected despite any imposed load or forces on the servo cylinder 32.

It is believed that a description of the operation of the servo control system as thus far described will serve to further the understanding of the invention. Assuming that there is no hydraulic fluid within the system and that the aircraft engine is not operating, it will be apparent that the auxiliary motor 25 must be energized to operate pump unit 21 to supply the system with hydraulic fluid. Having passed the check valve 27, the hydraulic fluid is introduced to the two main branch lines 28 and 29. The fluid passing through the line 28 will reach the chamber 41 within the servo cylinder 32. Since there is no fluid pressure within the servo chamber 42, the servo cylinder will be shifted toward the left to increase propeller pitch. The extent of movement of the servo cylinder in the high pitch direction may be limited by an elongated stop rod 85 which is adjustably secured within the piston 40. The said stop rod may be adjusted to project as desired into the servo chamber 42 so as to engage the plate 86 closing the right-hand end of the servo cylinder in a selected position of the cylinder. Accordingly, the extent of high pitch movement of the cylinder may be limited to correspond to a propeller pitch angle less than a full feather position. However, it is preferred that the stop rod 85 be fixed to permit a change in the pitch angle of the propeller to a full feather position. Thus, for the purpose of this description, it may be assumed that the servo cylinder 32 can be shifted far enough to permit feathering of the propeller.

The hydraulic fluid which enters the main branch line 29 passes through the normally open shut off valve 33 into the passage 34 for flow to the solenoid operated reversing valve 35 and for flow to the high pressure regulating valve 43. Since no fluid under servo pressure is admitted to the valve 43, the valve member 47 will be shifted upwardly by the spring 48 to permit high pressure flow through the line 54 and the topping governor valve 45 to the proportional solenoid operated valve 46. Since there is normally no signal transmitted to the proportional solenoid valve during engine inoperation, the solenoid operated valve member 75 will assume the neutral position shown. In such position, there can be no flow of high pressure fluid to the servo cylinder 42. Therefore, in order to supply the servo chamber with hydraulic fluid, it is necessary to impose a signal upon the proportional solenoid 77 to thrust the valve member 75 downwardly. It may be desirable to have a manually operable signal generator connected to the proportional solenoid for purposes of ground operation or means may be utilized to generate a signal within the electronic governor, which means should be adapted to selectively energize the electronic governor similarly to an overspeeding or underspeeding propeller. When the valve member 75 is thrust downwardly, hydraulic fluid at pump pressure will flow from the high pressure passage 61 through the valve 46 into the passages 62 and 63 and thus to the servo chamber 42. Upon receiving hydraulic fluid within the servo chamber 42, the servo cylinder 32 will be moved toward the right or in the low pitch direction. Low pitch movement of the servo cylinder may be limited by engagement of the appendage 87 on the plate 86 with a low pitch stop 88 which will be described in greater detail hereinafter.

In order to prevent the servo cylinder from engaging with the low pitch stop, it will be necessary to discontinue the signal to the proportional solenoid and to reduce pressure (Ps) in the servo cylinder. To reduce the servo pressure within the chamber 42, it will be necessary to impose another signal upon the proportional solenoid, such signal being similar to the signal transmitted when a propeller overspeeding condition arises. When such signal is received, the valve member 75 is elevated to permit drain of the hydraulic fluid from the servo chamber through the control valve 46 to the low pressure regulating valve 44. It will be quite apparent that alternating signals can be transmitted in the proportional solenoid to reciprocate the servo cylinder 32 and to thereby purge the system of entrapped air and supply all of the passages with hydraulic fluid under pressure.

After the system has been supplied with hydraulic fluid, engine operation may be instituted so that the main pump unit 10 will function and so that the auxiliary motor may be deenergized. With the engine in operation in accordance with a selected power setting, the proportional solenoid operated valve 46 will automatically control flow to and from the servo chamber to effect propeller speed control at the level in keeping with the selected power setting. This automatic operation of the valve 46 was fully described above. Also during engine operation, the topping governor will function to prevent dangerous overspeeding of the propeller in the manner described.

As previously mentioned, the hydraulic system is utilized to cause feathering of the propeller and is also utilized to change the pitch angle thereof to reverse positions. More specifically, when it is desired that the propeller be feathered, the mechanical feathering plunger 90 is thrust downwardly causing downward movement of the movable valve member 91 in the shut off valve 33. It will be noted that when the valve member 91 is thrust downwardly, the valve land 92 will close the passage 34 to the flow of hydraulic fluid at pump pressure. With the passage 34 closed, there can be no high pressure flow through the pressure regulating valve 43 and the control valve 45 and 46 to the servo chamber. Accordingly, there can be no increase in the pressure within the servo chamber such as would cause low pitch movement of the servo cylinder. The movable valve member 91 is provided with a downwardly extending appendage 93 which engages a normally closed spring biased valve plug 94. Upon being thrust downwardly, the valve member 91 thrusts the plug 94 downwardly to permit flow through the valve from a passage 95 to a passage 96. The passage 95 extends between the shut off and feathering valve 33 and the topping governor operated valve 45. At the valve 45, the passage 95 communicates with a port which is normally open to flow from the passage 62 which, as previously described, is connected to and contains fluid at the pressure of the fluid within the servo chamber 42. Accordingly, when the shut off and feathering valve is depressed, the servo chamber will drain through the control valve 45 and through the shut off valve into the passage 96 which is connected to the pressurized sump. The drain of hydraulic fluid from the servo chamber may be supplemented by drain through the proportional solenoid operated control valve 46. This may be effected by providing means for transmitting an "overspeeding" signal to the proportional solenoid when the feathering valve is depressed. Upon transmission of such signal, the proportional solenoid will elevate the valve member 75 to permit drain flow from the passage 62 to the low pressure producing valve 44 in the manner previously described.

In all events, the drain of the servo chamber 42 through the feathering and shut off valve 33 will continue as long as the valve member 91 is depressed. Accordingly, the servo cylinder 32 will shift to the full high pitch causing the propeller to be feathered.

It has been mentioned that the solenoid operated valve 35 is energized to effect reverse pitch movement of the propeller blades. It has also been mentioned that a low pitch stop 88 is provided to limit the extent of normal low pitch movement. The arrangement is such that the low pitch stop is shifted from the path of movement of the servo cylinder when the valve 35 is energized for reverse pitch. The said stop is pivotally mounted at 100 within a cap-like member 101 which is threaded to the frame or block structure 102 surrounding the servo cylinder. It will be seen that by adjusting the cap-like member 101 the low pitch stop 88 can be advanced toward or withdrawn from engagement with the servo cylinder. It is important to note that the pivoted stop 88 is disposed within a sleeve 103 which may be moved in a direction opposite to the servo cylinder by hydraulic fluid introduced through the passage 104. The sleeve engages a spring 105 which is seated against a lever 106 included in the pivoted stop structure and when the sleeve is shifted away from the servo cylinder by the force of hydraulic fluid in the passage 104, the spring 105 will pivot the stop 88 in the clockwise direction, as viewed in the drawing, to permit the appendage 87 on the cylinder plate 86 to pass the stop 88 as the cylinder is moved in the low pitch direction. After the cylinder appendage passes the low pitch stop, the propeller pitch angle will be changed to a reverse pitch. The limit of reverse pitch movement of the propeller may be fixed by a stop 107 which is adjustably secured within the cap-like member 101 to engage the appendage 87 in selected positions corresponding to selected reverse pitch angles.

The passage 104 normally contains hydraulic fluid at atmospheric pressure, since said passage is connected by a passage 108 which communicates with the atmospheric sump 12 through the solenoid operated valve 35. However, when the solenoid 109 included in the valve structure is energized, a valve member 110 is elevated to such a position that a land 111 closes the passage from the atmospheric sump and opens the passage 108 to the flow of hydraulic fluid at pump pressure from the passage 34. Thus, when the reversing solenoid 109 is energized, the valve 35 is positioned to cause hydraulic flow at pump pressure through the passage 104 to the sleeve 103 which pivots the low pitch stop out of position, permitting movement of the servo cylinder into reverse pitch positions.

It will be noted that the passage 104 is also connected to a servo 112 which includes a piston 113 adapted to engage a spring biased lever 114 and pivot the same so that the said lever will engage or be in position to engage the movable valve member 65 in the topping governor valve 45 so as to prevent upward movement of said member 65. Accordingly, the servo 112 is utilized to block the topping governor operated valve 45 and assure that the topping governor valve will not function to prevent overspeeding while the propeller blades are being set at reverse pitch. This prevents improper control operation by the topping governor control valve as might occur while the propeller is being put in reverse pitch positions.

From the foregoing description it should be understood that the hydraulic system normally functions to automatically control propeller pitch angle, and thus propeller speed, in response to propeller speed changes from a level in keeping with a selected engine power setting. The hydraulic servo system also functions to set the propeller at the extraordinary pitch angles, such as feather and reverse, when called for by the pilot. In all functions of the system, the pressure regulating and flow control valve arrangement assures the hydraulic flow necessary to produce pressures within the servo chamber sufficient for operation of the servo cylinder under all conditions.

It should be understood that while the invention has been described in connection with the specific hydraulic control system shown in the accompanying drawing, it is not the intent to limit the scope of the invention to the specifically described structure otherwise than indicated by the claims which follow.

I claim as my invention:

1. In a servo system having a servo motor with a working chamber, a control valve connected with the said chamber to subject the same to a first pressure or a second pressure whereby to actuate said servo motor, a first regulating valve connectible with a source of fluid under pressure and connected with said chamber to utilize the pressure therein as a reference pressure to establish said first pressure a predetermined amount above said reference pressure, and a second regulating valve having a drain port and connected with said chamber to use the pressure therein as a reference pressure to establish said second pressure a predetermined amount below said reference pressure, said first and second regulating valves being connected with said control valve.

2. A servo system comprising in combination, a servo motor having two chambers and adapted to be balanced when pressures within said chambers bear a predetermined relationship to each other and adapted for operation when the said pressures are in other than said predetermined relationship, means for continuously introducing fluid under pressure to one of said chambers, a control valve connected with the other of said chambers to subject the same to a first pressure or a second pressure whereby to actuate said servo motor, a first regulating valve connectible with a source of fluid under pressure and connected with said other chamber to utilize the pressure therein as a reference pressure to establish said first pressure a predetermined amount above said reference pressure, and a second regulating valve having a drain port and connected with said other chamber to use the pressure therein as a reference pressure to establish said second pressure a predetermined amount below said reference pressure, said first and second regulating valves being connected with said control valve.

3. A servo system comprising in combination, a servo motor having two chambers and adapted to be balanced when the pressures within said chambers bear a predetermined relationship to each other and adapted for operation when the said pressures are in other than said predetermined relationship, means for continuously introducing fluid under pressure to one of said chambers, means for producing fluid pressure a fixed amount greater than the pressure within the other of said chambers, and a flow control valve connected with said other chamber for selectively connecting the same to said pressure producing means, said pressure producing means comprising: a source of fluid at a pressure in excess of the pressure to be produced, means defining a passage interconnecting said source and said flow control valve, means defining a valve chamber connected with said other chamber, a valve member movable in said valve chamber and adapted to open said passage in response to fluid pressure in said other chamber and to close said passage in response to fluid pressure in that portion of the passage between the valve member and the control valve, and biasing means exerting a fixed force on said valve member to supplement the fluid pressure from said other chamber.

4. A servo system comprising in combination, a servo motor having two chambers and adapted to be balanced when pressures within said chambers bear a predetermined relationship to each other and adapted for operation when the said pressures are in other than said predetermined relationship, means for continuously introducing fluid under pressure to one of said chambers, means for producing fluid pressure a fixed amount less than the pressure within the other of said chambers, and a flow control valve connected with said other chamber for selectively connecting the same to said pressure producing means, said pressure producing means comprising: drain means at a pressure less than the pressure to be produced, means defining a passageway interconnecting said drain means and said flow control valve, means defining a valve chamber connected with said other chamber, a valve body movable in said valve chamber and adapted to close said passageway in response to fluid pressure in said other chamber and to open said passageway in response to fluid pressure in that portion of the passageway between the valve body and the control valve, and biasing means exerting a fixed force on said valve body to supplement the fluid pressure in said passageway.

5. A servo system comprising in combination, a servo motor having two chambers and adapted to be balanced when pressures within said chambers bear a predetermined relationship to each other and adapted for operation when said pressures are in other than said predetermined relationship, means for continuously introducing fluid under pressure to one of said chambers, means for producing fluid pressure a fixed amount greater than the pressure within the other of said chambers, means for producing fluid pressure a fixed amount less than the pressure within said other chamber, and a flow control valve connected with said other chamber and also connected with both of said pressure producing means for selectively connecting the said other chamber to the first or last mentioned pressure producing means, said first mentioned pressure producing means comprising: a source of fluid at a pressure in excess of the pressure to be produced, means defining a passage interconnecting said source and said flow control valve, means defining a valve chamber connected with said other chamber, a valve member movable in said valve chamber and adapted to open said passage in response to fluid pressure in said other chamber and to close said passage in response to fluid pressure in that portion of the passage between the valve member and the control valve, and biasing means exerting a fixed force on said valve member to supplement the fluid pressure from said other chamber.

6. A servo system comprising in combination, a servo motor having two chambers and adapted to be balanced when pressures within said chambers bear a predetermined relationship to each other and adapted for operation when said pressures are in other than said predetermined relationship, means for continuously introducing fluid under pressure to one of said chambers, means for producing fluid pressure a fixed amount greater than the pressure within the other of said chambers, means for producing fluid pressure a fixed amount less than the pressure within said other chamber, and a flow control valve connected with said other chamber and also connected with both of said pressure producing means for selectively connecting the said other chamber to the first or last mentioned pressure producing means, said last mentioned pressure producing means comprising: drain means at a pressure less than the pressure to be produced, means defining a passageway interconnecting said drain means and said flow control valve, means defining a valve chamber connected with said other chamber, a valve body movable in said valve chamber and adapted to close said passageway in response to fluid pressure in said other chamber and to open said passageway in response to fluid pressure in that portion of the passageway between the valve body and the control valve, and biasing means exerting a fixed force on said valve body to supplement the fluid pressure in said passageway.

7. A servo system comprising in combination, a servo motor having two chambers and adapted to be balanced when pressures within said chambers bear a predetermined relationship to each other and adapted for operation when said pressures are in other than said predetermined relationship, means for continuously introducing fluid under pressure to one of said chambers, means for producing fluid pressure a fixed amount greater than the pressure within the other of said chambers, means for producing fluid pressure a fixed amount less than the pressure within said other chamber, and a flow control valve connected with said other chamber and also connected with both of said pressure producing means for selectively connecting the said other chamber to the first or last mentioned pressure producing means, said first mentioned pressure producing means comprising: a source of fluid at a pressure in excess of the pressure to be produced, means defining a passage interconnecting said source and said flow control valve, means defining a first valve chamber connected with said other chamber, a valve member movable in said first valve chamber and adapted to open said passage in response to fluid pressure in said other chamber and to close said passage in response to fluid pressure in that portion of the passage between the valve member and the control valve, and biasing means exerting a fixed force on said valve member to supplement the fluid pressure from said other chamber, said last mentioned pressure producing means comprising: drain means at a pressure less than the pressure to be produced, means defining a passageway interconnecting said drain means and said flow control valve, means defining a second valve chamber connected with said other chamber, a valve body movable in said second valve chamber and adapted to close said passageway in response to fluid pressure in said other chamber and to open said passageway in response to fluid pressure in that portion of the passageway between the valve body and the control valve, and biasing means exerting a fixed force on said valve body to supplement the fluid pressure in said passageway.

8. A servo system comprising in combination, a servo motor including a cylinder, a piston disposed for relative sliding movement within said cylinder and defining two chambers therewithin, the movable one of said piston and cylinder being exposed over less area to one of said chambers than to the other of said chambers whereby said servo motor will be balanced when pressures within said chambers bear a predetermined relationship to each other and whereby said servo motor will operate when the said pressures are in other than said predetermined relationship, means for continuously introducing fluid under pressure to said one chamber, means for producing fluid pressure a fixed amount greater than the pressure within said other chamber, means for producing fluid pressure at a substantially identical fixed amount less than the pressure within said other chamber, and a flow control valve connected with said other chamber and also connected with both of said pressure producing means to selectively connect the said other chamber to said first or last mentioned pressure producing means.

9. A servo system comprising in combination, a servo motor including a cylinder, a piston disposed for relative sliding movement within said cylinder and defining two chambers therewithin, said piston being exposed over substantially less area to one of said chambers than to the other of said chambers, whereby said servo motor will be balanced when pressures within said chambers bear a predetermined relationship to each other and whereby said servo motor will operate when the said pressures are in other than said predetermined relationship, a source of fluid under pressure including means for continuously introducing the same to said one chamber, means for producing fluid pressure a fixed amount greater than the pressure in said other chamber, means for producing fluid pressure a fixed amount less than the pressure in said other chamber, and a flow control valve connected with said other chamber and also connected with both of said pressure producing means to selectively connect the said other chamber to the first or last mentioned pressure producing means, said first mentioned pressure producing means comprising: means defining a passage interconnecting said source and said flow control valve, means defining a first valve chamber connected with said other chamber, a valve member movable in said first valve chamber and adapted to open said passage in response to fluid pressure in said other chamber and adapted to close said passage in response to fluid pressure in that portion of the passage between the valve member and the control valve, and biasing means exerting a fixed force on said valve member to supplement the fluid pressure from said other chamber, said last mentioned pressure producing means comprising: drain means at a pressure less than the pressure to be produced, means defining a passageway interconnecting said drain means and said flow control valve, means defining a second valve chamber connected with said other chamber, a valve body movable in said second valve chamber and adapted to close said passageway in response to fluid pressure in said other chamber and to open said passageway in response to fluid pressure in that portion of the passageway between the valve body and the control valve, and biasing means exerting a fixed force substantially identical to the first mentioned force on said valve body to supplement the fluid pressure in said passageway.

10. A servo control system for adjusting the blade pitch angle of an aeronautical propeller and comprising in combination, a reversible servo motor operatively connected to the propeller blades and having two chambers and adapted to be balanced and thereby reflect an unchanging pitch angle when fluid pressures within said chambers bear a predetermined relationship to each other, said motor also being adapted to operate and thereby cause a change in pitch angle when said fluid pressures are in other than said predetermined relationship, means for continuously introducing fluid under pressure to one of said chambers, means for continuously producing fluid pressure a fixed amount greater than the pressure within the other of said chambers, means for continuously producing fluid pressure a fixed amount less than the pressure within said other chamber, and a flow control valve connected with said other chamber and also connected with both of said pressure producing means to selectively connect the said other chamber to the first or last mentioned pressure producing means whereby said servo motor may be selectively operated to decrease or increase the blade pitch angle.

11. A servo control system for adjusting the blade pitch angle of an aeronautical propeller and comprising in combination, a reversible servo motor having a working chamber and which is adapted to increase the pitch angle with a decrease in fluid pressure in said working chamber and to decrease the pitch angle with an increase in pressure in said working chamber, means for continuously producing fluid pressure a fixed amount greater than the pressure in said working chamber, means for continuously producing fluid pressure a fixed amount less than the pressure in said working chamber, a flow control valve connected with said working chamber and also connected with both of said pressure producing means and arranged to selectively connect said working chamber to the first or last mentioned pressure producing means, and a propelled speed responsive valve connected between said first mentioned pressure producing means and said flow control valve and arranged to block flow therebetween when propeller speed exceeds a predetermined level.

12. A servo control system for adjusting the blade pitch angle of an aeronautical propeller and comprising in combination, a servo motor operatively connected to the propeller blades and including a cylinder, a piston disposed for relative reciprocation within said cylinder and defining two chambers therewithin, said cylinder being exposed over substantially less area to one of said chambers than to the other of said chambers, said servo motor being adapted to be balanced and thereby reflect an unchanging pitch angle when fluid pressures within said chambers bear a predetermined relationship to each other, said cylinder and said piston being arranged for relative movement in one direction to cause pitch angle change in one direction when pressure in said other chamber is greater than balancing pressure, said cylinder and piston also being arranged for relative movement in the opposite direction to cause pitch angle change in the opposite direction when pressure in said other chamber is less than balancing pressure, a source of fluid under pressure including means for continuously introducing the same to said one chamber, means for continuously producing fluid pressure a fixed amount greater than the pressure within said other chamber, means for producing fluid pressure a fixed amount less than the pressure in said other chamber, and a flow control valve connected with said other chamber and also connected with both of said pressure producing means and adapted to selectively connect said other chamber to the first or last mentioned pressure producing means, said first mentioned pressure producing means comprising: means defining a passage interconnecting said source and said flow control valve, means defining a first valve chamber connected with said other chamber, a valve member movable in said first valve chamber and adapted to open said passage in response to fluid pressure in said other chamber and to close said passage in response to fluid pressure in that portion of the passage between the valve member and the control valve, and biasing means exerting a fixed force on said valve member to supplement the fluid pressure in said other chamber, said last mentioned pressure producing means comprising: fluid receiving means at a pressure less than the pressure to be produced, means defining a passageway interconnecting said receiving means and said flow control valve, means defining a second valve chamber connected with said other chamber, a valve body movable in said second valve chamber and adapted to close said passageway in response to fluid pressure in said other chamber and to open said passageway in response to fluid pressure in that portion of the passageway between the valve body and the control valve, and biasing means exerting a fixed force substantially equal to the first mentioned force on said valve body to supplement the fluid pressure in said passageway.

13. A servo control system for adjusting the blade pitch angle of an aeronautical propeller and comprising in combination, a reversible servo motor operatively connected to the propeller blades and having two chambers and adapted to be balanced and thereby reflect an unchanging pitch angle when fluid pressure within one of said chambers bears a predetermined relationship to the pressure within the other of said chambers, said motor also being adapted to increase the pitch angle when fluid pressure in said other chamber is less than balancing pressure and to decrease the pitch angle when fluid pressure in said other chamber is greater than balancing pressure, means for continuously introducing fluid under pressure to said one chamber, means for producing fluid pressure a fixed amount greater than the pressure within said other chamber, means for producing fluid pressure a fixed amount less than the pressure within said other chamber, a flow control valve connected with said other chamber and also connected with both of said pressure producing means and arranged to selectively connect said other chamber to the first or last mentioned pressure producing means, and a propeller speed responsive valve connected between said first mentioned pressure producing means and said flow control valve and arranged to block flow therebetween and to connect said last mentioned pressure producing means to said other chamber when propeller speed exceeds a predetermined level.

References Cited in the file of this patent

UNITED STATES PATENTS

| | | |
|---|---|---|
| 2,343,382 | Martin | Mar. 7, 1944 |
| 2,381,923 | Obstresal | Aug. 14, 1945 |
| 2,383,894 | Sloane | Aug. 28, 1945 |

UNITED STATES PATENT OFFICE
CERTIFICATE OF CORRECTION

Patent No. 2,840,170                                            June 24, 1958

Stanley G. Best

It is hereby certified that error appears in the printed specification of the above numbered patent requiring correction and that the said Letters Patent should read as corrected below.

Column 1, line 46, for "fore" read -- more --; column 3, line 15, for "presure" read -- pressure --; column 4, line 67, after "position", and before the period, insert -- shown --; column 6, line 60, for "increased" read -- increase --.

Signed and sealed this 26th day of August 1958.

(SEAL)

Attest:

KARL H. AXLINE

Attesting Officer

ROBERT C. WATSON
Commissioner of Patents